United States Patent [19]

Philips

[11] 4,196,629
[45] Apr. 8, 1980

[54] FIBER OPTIC MACHINERY PERFORMANCE MONITOR

[76] Inventor: Gerald J. Philips, 1168 St. George Dr., Annapolis, Md. 21401

[21] Appl. No.: 953,826

[22] Filed: Oct. 23, 1978

[51] Int. Cl.$^2$ .................. G01N 21/32; G01M 1/16
[52] U.S. Cl. .................................. 73/593; 73/462; 73/661; 324/175
[58] Field of Search ................ 73/593, 655, 505, 507, 73/510, 657, 660, 661, 462; 324/175

[56] References Cited

U.S. PATENT DOCUMENTS

| | | | |
|---|---|---|---|
| 2,983,556 | 5/1961 | Coan | 73/507 X |
| 3,273,447 | 9/1966 | Frank | 73/655 |
| 3,327,584 | 6/1967 | Kissinger | 73/655 X |
| 3,913,084 | 10/1975 | Bollinger et al. | 73/660 X |
| 3,926,053 | 12/1975 | Schurrer et al. | 324/175 X |
| 3,932,746 | 1/1976 | Swanson | 324/175 X |
| 4,046,017 | 9/1977 | Hill | 73/462 |
| 4,064,704 | 12/1977 | Blackburn | 73/462 |
| 4,093,853 | 6/1978 | Hunt | 324/175 X |

OTHER PUBLICATIONS

Publication: "Detection, Diagnosis and Prognosis", Dec. 1975, NBS Special Publication No. 436–G. J. Philips, pp. 18–28.
Publication: "Optical Displacement Measuring Device" by Hamrick et al., IBM Technical Disclosure Bulletin (p. 85), vol. 5, No. 7, 12/61.

Primary Examiner—Daniel M. Yasich
Attorney, Agent, or Firm—R. S. Sciascia; Q. E. Hodges

[57] ABSTRACT

This system monitors the operation of ball bearings in rotating machinery by continuously measuring the radial deflections of the outer race of these bearings using a fiber optic proximity probe. A second sensor is used to measure the rate of rotation of the machine's shaft. One of the frequency components in the signal produced by the proximity probe will be equal to the rate at which the balls in the bearing pass by the probe. The ratio of this ball pass frequency to the rotation frequency from the second probe is computed. The ratio of the peak value to the RMS value of the higher frequency noise components from the proximity probe signal is also computed. These two ratios are used to predict oncoming bearing failures and to determine if bearings have been properly installed. The component of the proximity probe output which is at the frequency of rotation of the rotor may be filtered and its phase angle may be measured to determine the angular placement of any unbalanced weight on the rotor.

5 Claims, 13 Drawing Figures

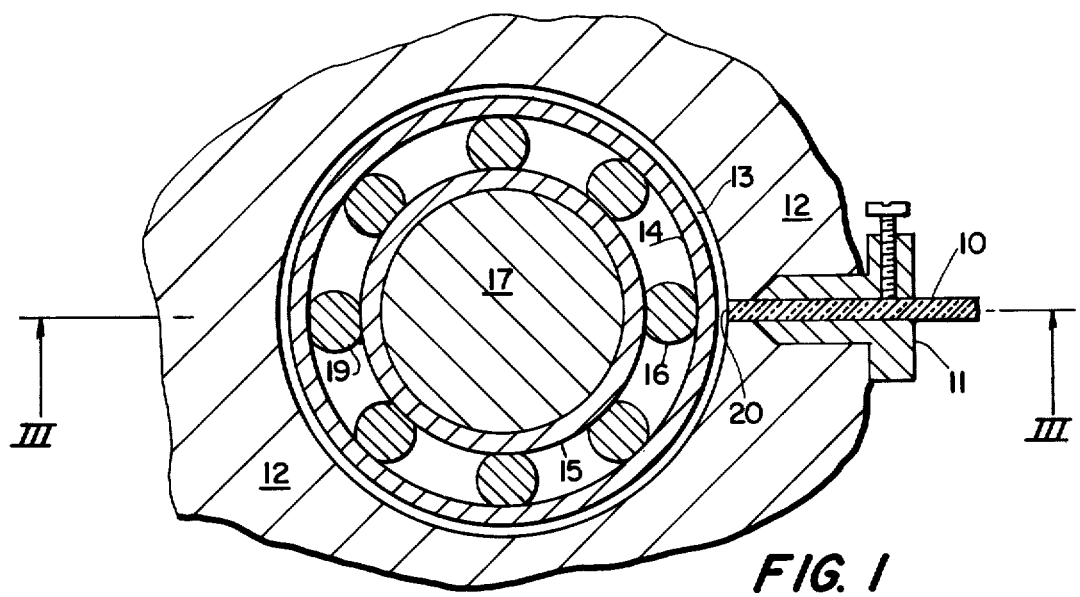
FIG. 1
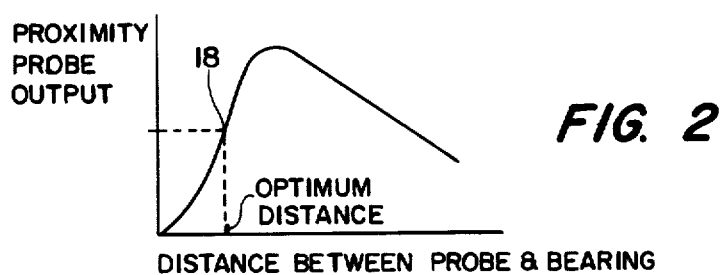
FIG. 2
FIG. 3
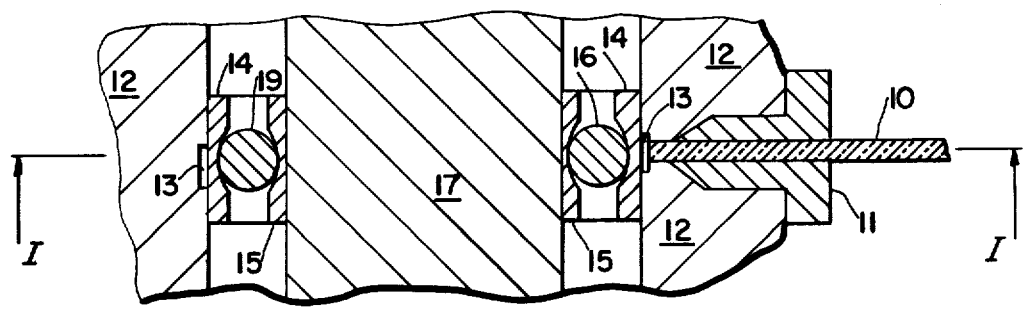

FIBER OPTIC MACHINERY PERFORMANCE MONITOR

The invention described herein may be manufactured and used by or for the Government of the United States of America for governmental purposes without the payment of any royalties thereon or therefor.

BACKGROUND OF THE INVENTION

The field of this invention generally includes instruments for monitoring the performance of bearings on rotating shafts and in particular systems for monitoring the operation of ball bearings in rotating machinery. The field of this invention also includes systems for measuring the angular position and size of unbalanced weight on electric motor and other machine rotors.

The prior art systems for monitoring the operation of ball bearings in rotating machinery use accelerometers or other vibration sensors mounted on the outside of the machine housings to detect the vibrations from the bearings. Vibrations which are produced by the rotor and transmitted to the machine housing through the bearing as well as vibrations produced within the bearings and vibrations produced in the housing of the machine are all detected by the vibration sensors. The frequency and amplitude characteristics of the vibrations produced within or transmitted through the ball bearings are considerably changed by the time the vibrations reach the sensors mounted on the outside of the machine housing. These changes result from the fact that the transmission path travelled by these vibrations through the machine housing has its own resonance, attenuation and phase shift characteristics which are imposed upon the vibration signals from the bearings. These transmission characteristics between the bearings and the sensors mounted on the outside of the machine housing may vary widely as the sensors are moved from one place to another. Therefore, the signals produced by these vibration sensors are difficult to interpret. One common practice is to record baseline data on the frequency spectrum of the vibrations produced by each type of machine while in operation. With a given ball bearing in the machine and with the machine operating at a given speed, certain of the peaks in the frequency spectrum are identified as being produced within the bearings. When one of these bearing related peaks in the vibration frequency spectrum increases in amplitude, an oncoming bearing failure is indicated. Interpreting vibration data in this manner tends to be very difficult since the vibration frequency which indicates bearing failure will depend upon the location of the vibration sensor, the type of bearing, the size and shape of the machine housing, and on the clearances between the bearing and its housing. Any variable which may change the transmission path of the vibrations as they travel from the bearing to the vibration sensor will effect the baseline vibration data and make this data more difficult to interpret.

When the rotor of a machine is not perfectly balanced, it will produce vibrations at its frequency of rotation. These vibrations will be transmitted through the bearings and the machine housing and may be detected by the same vibration sensors as are used to monitor the bearing operation. The machine's rotor may be balanced by attempting to add or subtract weight from the rotor in such a way as to minimize this signal. However, the vibration waves undergo varying amounts of attenuation and phase shift as they travel from the out of balance rotor through the bearing and machine housing to the vibration sensors. The size of these phase shifts depend upon the size and shape of the machine housing as well as the location of the sensors on the housings. Therefore it is difficult to determine the angular position on the rotor from which weight should be added or subtracted to balance the rotor.

The present inventor has found that these problems in the prior art could be solved if the vibrations were measured at the ball bearings themselves and not at some location remote from the ball bearings. Accordingly, it is an objective of this invention to measure vibration directly on the surfaces of ball bearings before the vibration signals are distorted by travelling through the machine housing and other structures. The inventor found that if vibrations are measured directly from the surfaces of a rotating ball bearing, it is easier to determine the sources or causes of the individual components of the vibration signals. Accordingly, another objective of this invention is to simplify the analysis required to interpret the vibration signals received from ball bearings. A third objective of the invention is to provide a system which can monitor from a central location the operation of ball bearings on several widely dispersed pieces of machinery. A fourth objective of this invention is to provide a simplified but accurate method of determining the angular position of unbalanced weight on rotors supported by ball bearings.

SUMMARY OF THE INVENTION

This invention achieves those objectives by using fiber optic proximity probes mounted in the machine housing to directly measure the vibrations on the outer race of the ball bearings. Two of the principal components of the signal produced by this proximity probe are the frequency of rotation of the shaft and the frequency at which balls in the bearings pass by the probe. The signal will also contain broadband noise indicating roughness at frequencies higher than these two principle components. The rato of the peak to the RMS value of this wideband higher frequency noise is one good measure of the operation or defects of a ball bearing. Another measure of ball bearing operation is the bearing speed ratio which is the ratio of the ball passing frequency to the shaft rotation frequency. As this invention is applied to a typical electric motor, two proximity probes are used to measure the vibrations on the outer races of each of the two ball bearings and another sensor is used to measure the rate of rotation of the motor's shaft. Various circuits are used to calculate or compute the peak to RMS ratio of the higher frequency noise and the bearing speed ratio. These two ratios plus the RMS value and the peak value of the higher frequency noise are displayed on meters. Careful analysis of the vibration waveforms obtained by these proximity probes can sometimes reveal whether a defect or roughness in a ball bearing is located on one of the balls, on the inner race or on the outer race. The value of the bearing speed ratio indicates the amount of axial load on the bearing, the extent to which the bearing is installed too loosely or too tightly within the bearing housing, as well as the condition of the bearing lubricant. The angular position of unbalanced weight on a rotor may be determined by separating out that component of the proximity probe signal which is at the frequency of rotation of the rotor shaft and comparing the phase difference between this component and another signal at the same frequency which is synchronized with the angular position of a fixed point on the rotor shaft. This phase difference will be equal to the angular separation between this fixed point on the rotating shaft and the location of the unbalanced weight on the shaft.

BRIEF DESCRIPTION OF THE DRAWINGS

FIG. 1 is a cross-sectional view of a ball bearing mounted within a motor housing showing the manner in which the proximity probe is installed to monitor the bearing operation.

FIG. 2 is a graph showing how the signal amplitude produced by the fiber optic proximity probe varies as a function of the distance between the probe and the bearing.

FIG. 3 is another cross-sectional view of the same bearing, motor housing, and proximity probe that are illustrated in FIG. 1.

Where the same feature of the invention appears in more than one of the Figures, it is labelled with the same reference number.

DESCRIPTION OF THE PREFERRED EMBODIMENT

Figure 4:
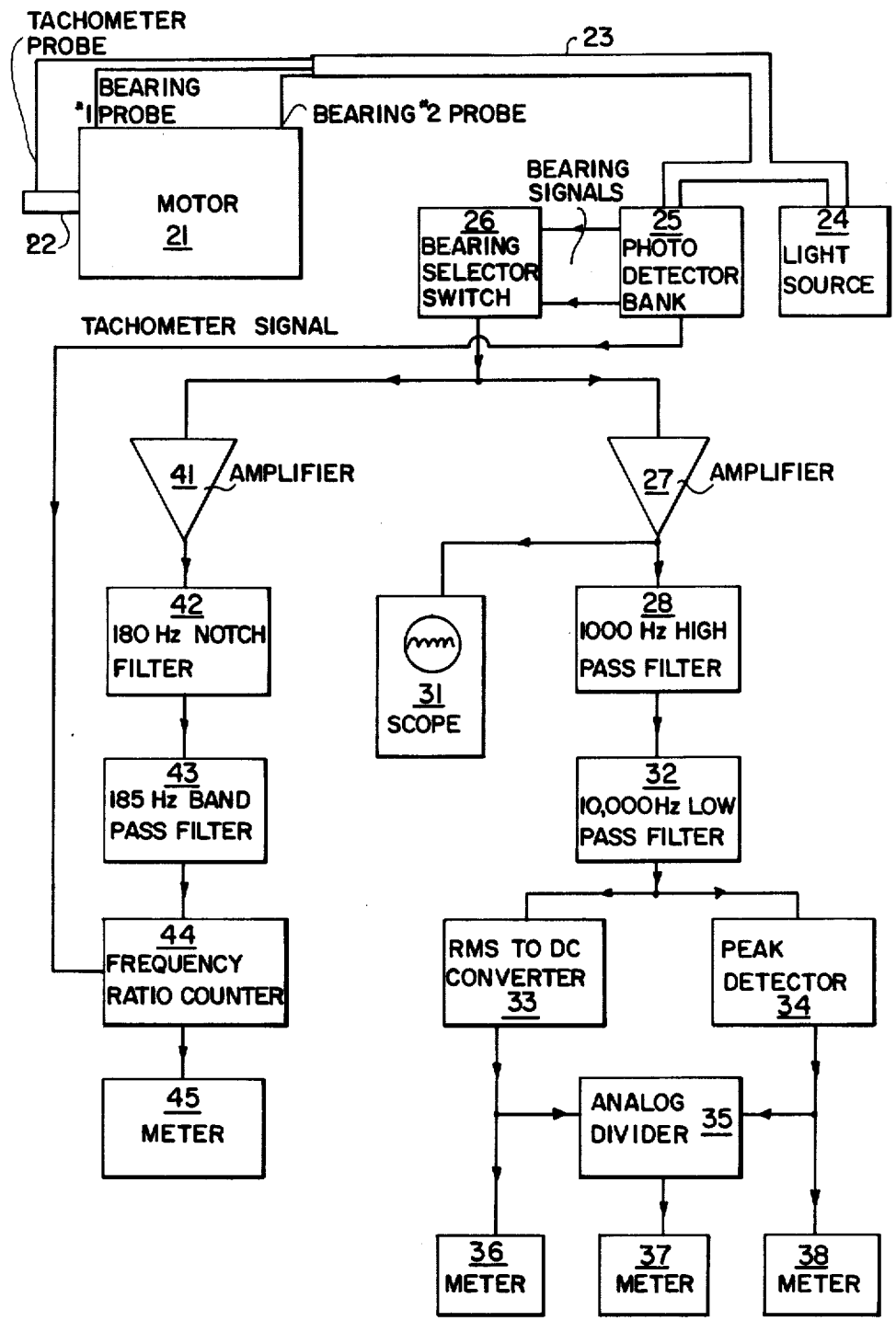
FIG. 4 is a block diagram of the ball bearing monitoring system for an electric motor.

FIGS. 1, 2, and 3 illustrate how a fiber optic proximity probe may be installed in the bearing housing of an electric motor to monitor the operation of the ball bearing. The ball bearing comprises the inner race 15, the outer race 14, and a plurality of rotable load transmitting elements such as balls 16 and 19. The inner race 15 of the bearing is mounted on the rotating motor shaft 17 with a tight fit. The outer race 14 of the bearing fits into the bearing housing 12 with a close fit but not so tight as to prevent the outer race from being rotated or moved axially within the bearing housing. In most electric motors, one of the two ball bearings is firmly locked into place to prevent axial movement so as to fix the axial position of the shaft within the motor. The other ball bearing is usually allowed to float in its axial location so that as the rotor and shaft heat up and expand, the floating bearing will be able to move axially with the end of the shaft within the bearing housing. The bearing illustrated in FIGS. 1 and 3 is one of these floating bearings. Before the bearing is mounted in the motor housing 12, an annular shaped undercut 13 may be machined into the inside cylindrical surface of the bearing housing. The fiber optic proximity probe 10 operates by reflecting light off the cylindrical outer surface of the outer race 14. The cylindrical undercut 13 serves the purpose of reducing the amount of fretting corrosion on the outside race 14 which would reduce its reflectivity and thus reduce the sensitivity of the probe. The prior art also discloses the use of similar annular undercuts for the purpose of reducing the transmission of vibrations from the bearing to the bearing housing. The annular undercut 13 may be eliminated for purposes of this invention if an automatic gain control means is incorporated into the photo detector bank 25 shown in FIG. 4 to compensate for changes in reflectivity caused by fretting corrosion on the surface of the outer race 14. The fiber optic proximity probe 10 comprises a bundle of optic fibers half of which are used to transmit light between a light source and the outside surface of the outer race 14 of the ball bearing and the other half of which are used to transmit light reflected from the ball bearing to a photo detector. At the sensing end 20 of the probe 10, all of the transmitting and receiving optic fibers terminate at the same point to form a surface perpendicular to the axis of the probe. FIG. 2 shows a typical curve illustrating how the intensity of the reflected light received and transmitted back to the photo detector varies as a function of the distance between the sensing end 20 of the proximity probe and the outer surface of the bearing. The position of the proximity probe 10 within the probe mount 11 should be adjusted so that the probe will be operating in the portion of this output curve which has a linear positive slope such as at point 18.

The inventor has discovered that the outer race of a ball bearing installed in a motor will tend to be elastically deflected or deformed radially outward as much as a few hundred microinches in the vicinity surrounding each of the balls. As the shaft supported by the ball bearing rotates and the balls rotate within the bearing, these radially outward deflections on the outside surface of the outer race will travel around the circumference of the outer race along with the balls causing the deflections. The fiber optic proximity probe is used to detect these rotating deflections in the outer bearing race. The resulting signal will be at a frequency equal to the rate at which the balls pass by the proximity probe. Any vibrations which may occur on the rotating shaft or within the bearing may also cause radial movements of the outer race of the bearing which will be detected by the proximity probe. If the rotor mounted on the ball bearing is not perfectly balanced, the proximity probe will detect radial movements of the bearing at the same frequency as the frequency of rotation of the rotor. Any minor discontinuities or roughness on the balls or the surfaces of the bearing races which contact the balls will tend to produce slight vibrations which will be transmitted to the outer race and detected by the proximity probe.

Figure 5A:
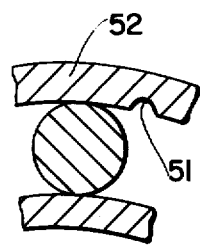
FIGS. 5A, 5B, and 5C illustrate the waveforms produced by the proximity probe which are characteristic of three types of bearing defects.
Figure 5A:
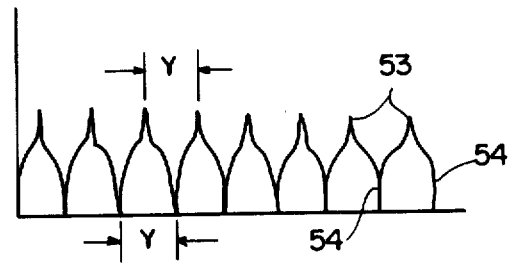
Figure 5B:
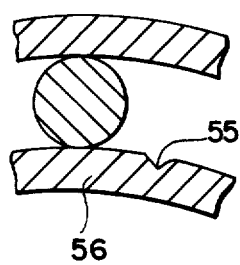
Figure 5B:
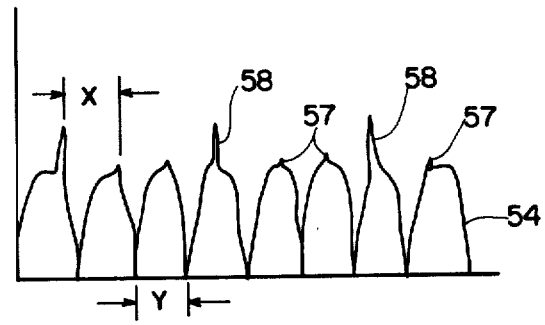
Figure 5C:
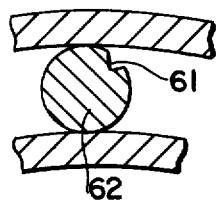
Figure 5C:
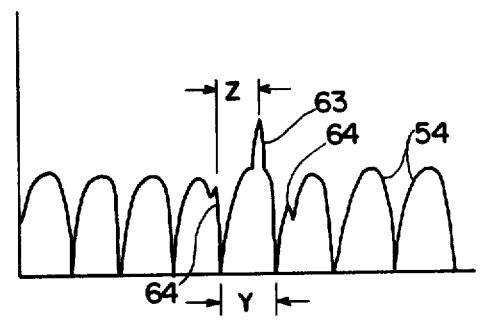

FIGS. 5A, 5B, and 5C illustrate the type of waveforms which will be detected by the proximity probe as a result of three types of defects in a ball bearing. In these illustrations it is assumed that the rotor supported by the ball bearing is perfectly balanced and that the defects cause positive going pulses to appear on top of the normal waveform. The normal waveform which will be obtained from a light probe monitoring a defect free ball bearing which supports a perfectly balanced rotor will be very similar to a rectified sign wave such as the waveforms 54 in FIG. 5A. In FIG. 5A the defect 51 is on the outer race 52 of the ball bearing and causes the pulses 53. The pulses 53 repeat themselves at the same time interval Y as the basic waveform 54. In FIG. 5B the defect 55 is on the inner race 56 of the bearing and causes the pulses 57 and 58 on the basic waveform 54. The time period X between the pulses will be less than the time period Y between repetition of the basic waveform 54. This is a result of the fact that the inner race 56 has a smaller circumference than the outer race. The larger pulses 58 occur when a ball strikes the defect 55 while it is near the proximity probe and the smaller pulses 57 occur when the ball strikes the defect 55 when it is located further away from the probe. In FIG. 5C the defect 61 on the ball 62 will produce a large pulse 63 every time that the defective ball passes by the proximity probe. Smaller pulses 64 will be produced on either side of the large pulse 63. The time period Z between these pulses is equal to the time required for the ball to rotate one-half of a turn.

The signals produced by the optic fiber proximity probe may be analyzed automatically by circuits such as shown in the block diagram of FIG. 4 which illustrates a complete system for monitoring from a central location the operation of all the ball bearings in an electric motor and in several other machines. The light source 24 transmits a beam of light through the bundle of optic fibers 23 to the bearing number 1 probe, bearing number 2 probe and the tachometer probe on motor 21 and to similar probes on other machines. The bearing probes are mounted as shown in FIGS. 1 and 3. Each of the tachometer probes will produce one pulse for each rotation of the shaft by detecting a highly reflective surface which is attached to the rotating shaft of the machine such as shaft 22 and which passes underneath the tachometer probe once for each revolution. The tachometer probes are adjusted so that they are relatively insensitive to variations in the distance between the shaft and the sensing end of the probes. Each of the probes contains receiving fibers which transmit reflected light from the surface of the bearings or the rotating shaft back to the bank of photo detectors 25 which create electric signals proportional to the intensity of the reflected light transmitted through the optic fibers. The machine selector switch 29 selects the detected signals from the bearing and tachometer probes of one of the machines being monitored. The tachometer signal is sent directly to the frequency ratio counter 44 and the bearing signals go to the bearing selector switch 26.

Because the analysis circuits shown in the block diagram of FIG. 4 are able to analyze the signals from only one bearing at a time, the selector switch 26 is needed to select which bearing signal to analyze. The selected bearing signal is amplified by amplifier 41 and filtered by the filters 42 and 43. The frequencies for the filters which are shown in FIG. 4 were selected for motors which rotate at 1800 revolutions per minute or 30 revolutions per second. The frequency of the narrow band pass filter 43 is selected so that it will attenuate all frequencies except the ball pass frequency which is the frequency at which balls pass by the proximity probes. The 180 Hz notch filter 42 is needed to remove the third harmonic of the electrical power frequency and the sixth harmonic of the shaft rotation frequency from the bearing signal. The purpose of the filters 42 and 43 is to produce an output signal which contains nothing other than the basic ball pass waveform 54 as illustrated in FIG. 5A. The frequency of the bandpass filter 43, in this case 185 Hz, is calculated based on the geometry of the bearings and the speed of the rotors. The frequency ratio counter 44 divides the ball pass frequency by the frequency of rotation of the selected motor's shaft to obtain the bearing speed ratio which is displayed on the meter 45. The selected bearing signal is also amplified by amplifier 27 and sent through the high pass filter 28 and low pass filter 32. The 1,000 Hz cut-off frequency of the high pass filter 28 was chosen to filter out the ball pass frequency, the shaft rotation frequency and the low order harmonics of these frequencies from the bearing signal. The low pass filter 32 is needed to filter out the higher frequency noise which is not related to the operation of the bearings. The signal at the output of filter 32 will consist of wide band noise. This noise will include signals resulting from defects within the bearing such as the pulses 53, 57, 58, and 63 in FIG. 5. The circuits 33, 34, and 35 calculate or compute the peak value, the RMS value and the ratio of the peak value to the RMS value of this wide band noise. These three values are then displayed on meters 36, 37, and 38. The unfiltered bearing signal may also be observed on the scope 31 to analyze the waveforms as in FIG. 5. Although a fiber optic probe is used to obtain the tachometer signal in FIG. 4, any standard device for producing a signal at the frequency of rotation of a shaft may be used in place of the tachometer probe.

Figure 6:
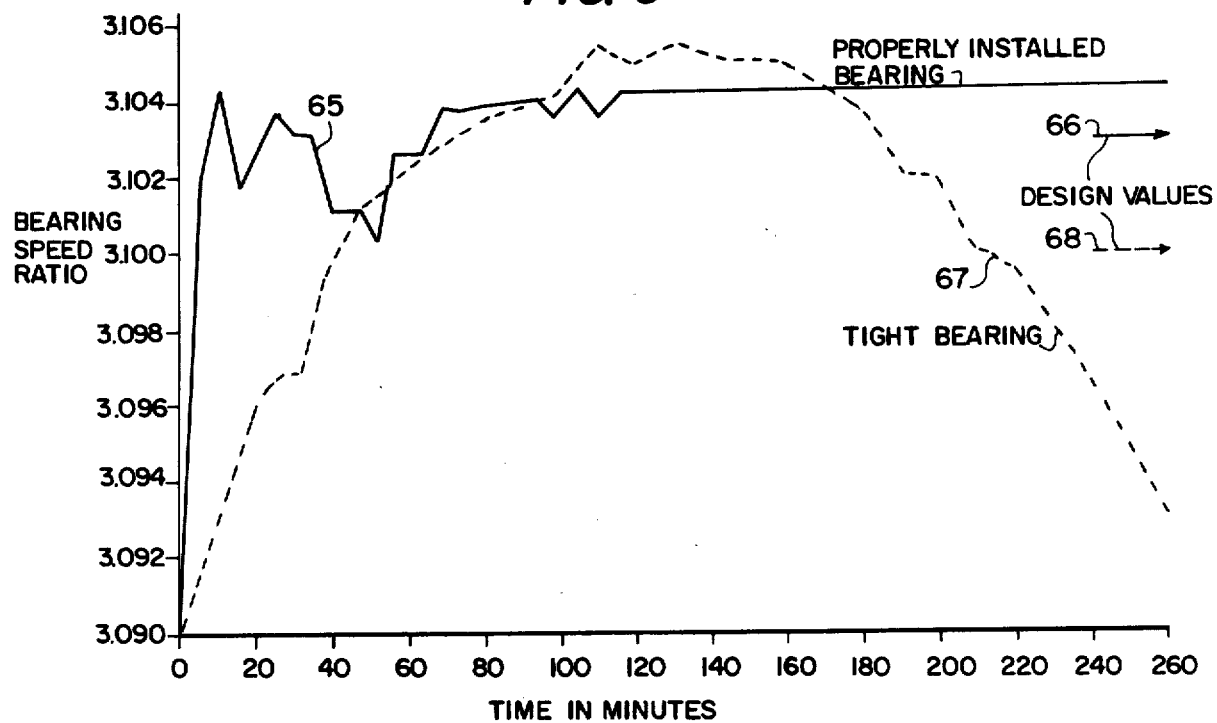
FIG. 6 is a graph illustrating two case examples of how the bearing speed ratios of a loose fitting bearing and a tight vary over time.
Figure 7:
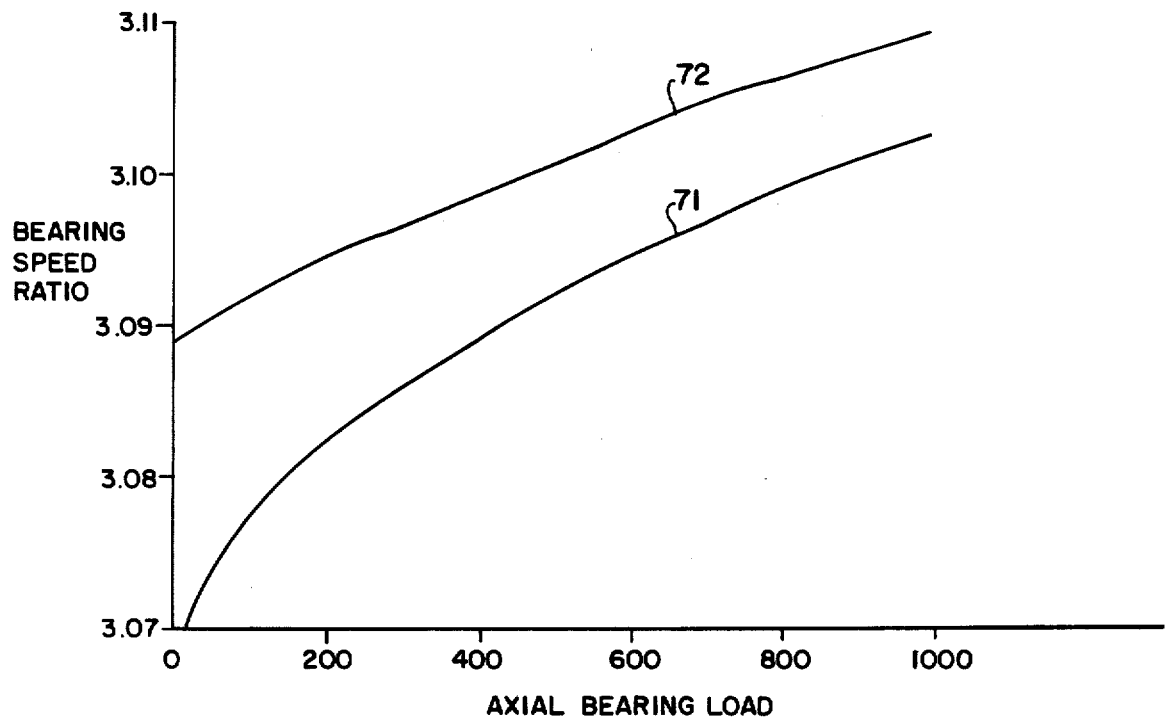
FIG. 7 is a graph illustrating how the bearing speed ratio of a typical ball bearing will vary as a function of the axial load on the bearing.
Figure 10:
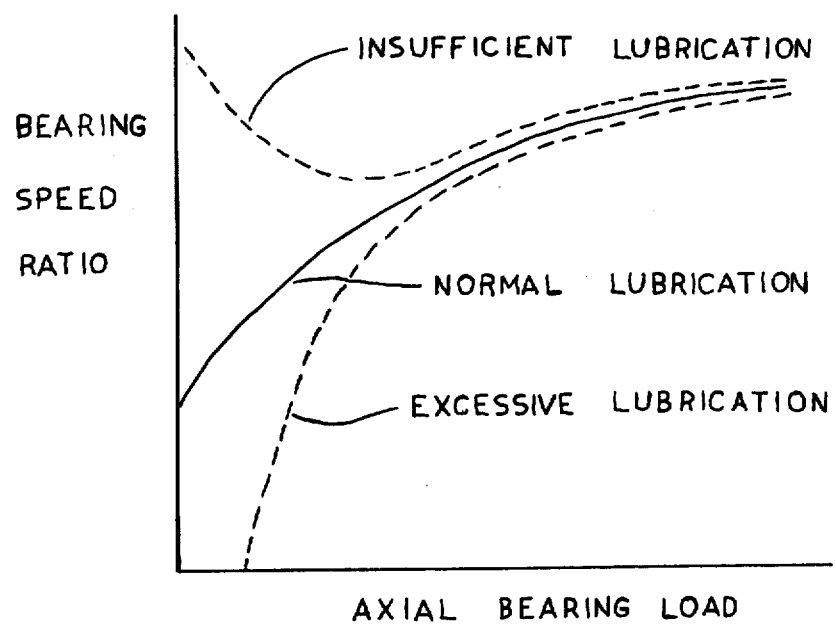

A peak to RMS ratio of 1.5 or greater for example as displayed on meter 37 will indicate that the bearing being monitored has a defect on one of its rolling surfaces which will generate a failure. The bearing's speed ratio, as displayed on meter 45, will indicate that the ball bearing is not operating properly and may eventually fail if the ratio is outside the range of values required for normal bearing operation. The two curves 71 and 72 in FIG. 7 give the normal range of bearing speed ratios for a typical ball bearing as a function of the axial load exerted on the bearing. For a given axial load on a ball bearing, the bearing's speed ratio will depend upon the amount of clearance within the bearing. This clearance depends upon the way a particular bearing was manufactured and the amount by which the inner race of the bearing was forced to expand when the bearing was mounted on the shaft. For the bearing illustrated in FIG. 7, curve 71 gives the bearing speed ratios for the minimum allowable bearing clearance and curve 72 gives the bearing speed ratios for the maximum allowable bearing clearance. The bearing speed ratio, as obtained from meter 45 in the block diagram of FIG. 4, may therefore be used as an indication that either the bearing clearance or the axial bearing load are outside of their allowed tolerances. The graph of FIG. 6 shows the bearing speed ratios of two different bearings measured by the inventor over periods of operation lasting 260 minutes. Each of these two bearings were installed as the floating bearing in a motor and therefore, if properly installed, should have had a small but constant axial load on them. The bearing whose speed ratio is shown by curve 65 was properly installed. After a brief thermal transient the speed ratio of this bearing settled down very close to its design value 66. The bearing whose speed ratio is shown in curve 67 was installed too tightly within the bearing housing so that the floating bearing could not move axially as the shaft of the motor expanded and contracted. As a result, the axial load and the bearing speed ratio were first much higher than and later much lower than the design value 68. In a similar manner, this invention may be used to determine if any bearing has been improperly installed so as to cause the axial load or the bearing clearance to be outside the desired values. The speed ratio curves 71 and 72 of FIG. 7 are given for the condition of satisfactory lubrication. When abnormal of unsatisfactory lubrication conditions are encountered, which cause ball skidding, the speed ratio will deviate from the normal or predicted values. FIG. 10 illustrates that excessive lubrication tends to lower the speed ratio and insufficient lubrication tends to increase the speed ratio. It is noted that these deviations become increasingly severe as zero load is approached. In summation, bearing speed ratio deviations above predicted values indicate: (a) excessive bearing internal clearance; (b) insufficient lubrication; or (c) excessive loading. Conversely, bearing speed ratio deviations below predicted values indicate: (a) insufficient bearing radial clearance; (b) excessive lubrication; or (c) insufficient loading.

Figure 8:
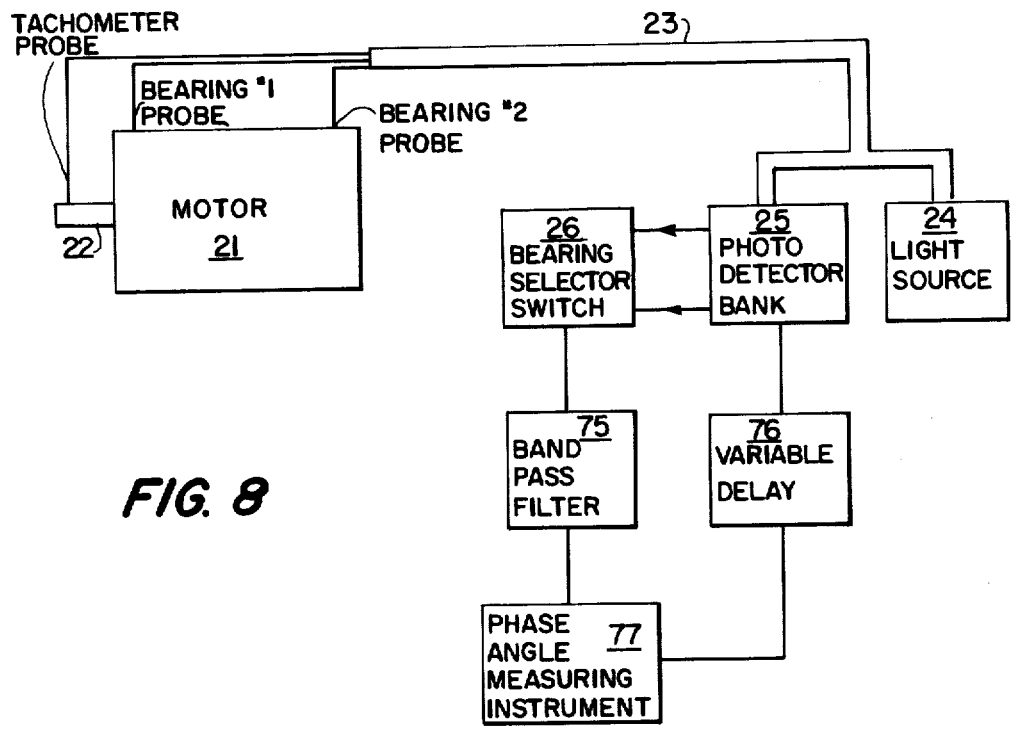
FIG. 8 is a block diagram of a system for measuring the angular position of unbalanced weight on the motor's rotor.
Figure 9A:
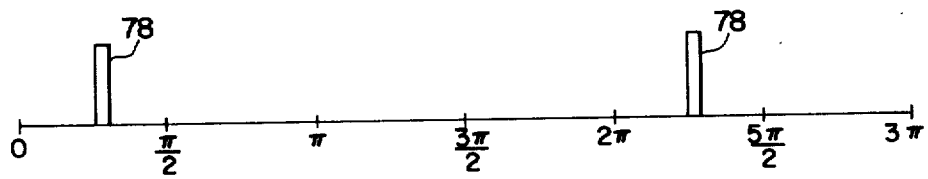
FIGS. 9A and 9B illustrate two typical waveforms which would be produced by the system of FIG. 8.
Figure 9B:
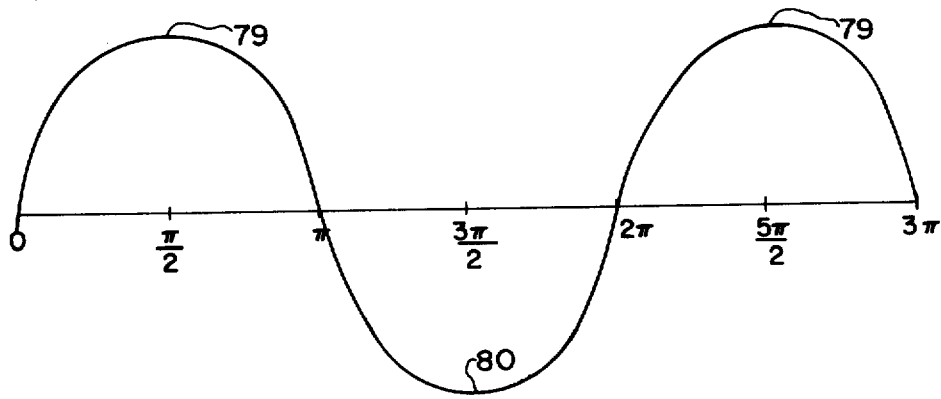

The bearing signals received from fiber optic proximity probes may be used to determine the angular position and relative size of unbalanced weight on a motor's rotor. FIGS. 7, 9A and 9B illustrate how this may be done. The two bearing proximity probes and the tachometer probe are mounted on the motor 21 and near the motor shaft 22 in the same way as was done in the bearing monitoring system of FIG. 4. Also in the same way, the light source 24 provides light to the probe and the photo detector bank 25 detects reflected light signals from the probes transmitted through the bundle of optic fibers 23. One of the two bearing signals is selected by switch 26 and fed to the bandpass filter 75 which filters out all frequency components of the signals except those at the frequency of rotation of the shaft 22. The tachometer probe and the photo detectors are adjusted so that a single timing pulse, such as the pulse 78 in FIG. 9A, will be produced every time a fixed timing point on the shaft 22 rotates underneath the tachometer probe. The output of the bandpass filter 75 will be a sine wave as shown in FIG. 9B. The variable delay circuit 76 delays the pulses 78 to compensate for differences in the angular position about the rotor between the tachometer probe and the bearing probe and also to compensate for delays imposed upon the sine wave of FIG. 9B by the bandpass filter 75. When the unbalanced weight on the rotating shaft is at the same angular position about the shaft as is the stationary bearing probe, the distance between the sensing end of the probe and the outer race of the bearing will be at its minimum. When the unbalanced weight on the shaft is rotated 180° away from the probe, the distance between the sensing end of the probe and the outer race of the bearing will be at its maximum. The circuits are adjusted so that the positive going peaks 79 of the sine wave at the output of the bandpass filter 75 will correspond to the minimum distance between the bearing and the probe and the negative going peak 80 of the sine wave will correspond to the maximum distance between the probe and the bearing race. With the circuits adjusted in this way, the difference between the angular position of the fixed timing point on the shaft 22 and the position of the unbalanced weight on the rotor will be equal to the phase angle difference between the waveforms in FIGS. 9A and 9B. In FIG. 9 the phase angle difference is approximately 45°. This phase angle difference is measured in block 77 using any standard instrument for making such measurements. For example, the pulse 78 could be used to trigger the sweep on an oscilloscope, the waveform of FIG. 9B could be displayed on a horizontal axis of the scope and the horizontal axis could be calibrated in units of phase angle so that the phase angle difference between the peak 79 and the beginning of the sweep could read directly from the scope. Instead of using a fiber optic proximity probe to obtain the timing pulses 78, other standard probes or signal generating devices may be used to create pulses synchronized with the rotation of a fixed timing point on the shaft. The critical requirement for such a tachometer is that it produce pulses whose phase angle has a fixed relationship with the angular position of the fixed timing point on the shaft. An alternative way of implementing the block diagram of FIG. 8 would be to install a tachometer whose output is a sine wave, the frequency of the sine wave being equal to the rate of rotation of the shaft 22 and the phase angle of the sine wave being synchronized with the angular position of the timing point on the shaft. The variable delay 76 could adjust the phase angle of this tachometer sine wave so that the positive going peak of the tachometer sine wave will always occur when the shaft 22 is at a given angular position. The phase difference would then be measured between the sine wave at the output of bandpass filter 75 and the tachometer sine wave at the output of the variable delay circuit 76. This phase difference could also be measured using an oscilloscope by having the positive going zero crossing of the tachometer sine wave trigger the horizontal sweep of the scope, displaying the bearing probe sine wave across the scope and calibrating the horizontal sweep in units of phase angle.

Whereas the preferred embodiment of this invention has been described in terms of it's application to electric motors, this invention may also be used with other rotating machinery which use ball bearings. Obviously many other modifications and variations of this invention are possible in light of the above teachings. It is therefore to be understood that within the scope of the appended claims the invention may be practiced otherwise than as specifically described.

What is claimed is:
1. A system for monitoring operating conditions of and indicating defects and surface roughness in an antifriction bearing having an inner race mounted on a shaft for rotation, a fixedly mounted outer race, and rotatable elements disposed between the races comprising in combination:

an elongate bundle of fiber optics having one extremity in communication with a light source and its other extremity terminating in a sensing end mounted in close proximity to the outward radial surface of the outer race for illuminating a portion thereof and for receiving reflected light signals therefrom which varies in magnitude with the distance between the outer race and the sensing end whereby each of the rotatable elements in moving along the outer race cause outward elastic deformations thereof which are sensed by the sensing end;

means for converting the light signals received by the sensing end into electric signals;

tachometer probe and circuit means for producing an electric signal whose frequency is equal to the rate of rotation of the shaft;

means computing the frequency at which rotatable elements pass the sensing end divided by the frequency of shaft rotation thereby monitoring operating conditions of the antifriction bearing;

filter means passing components of the electric signals whose frequencies are equal to the rate of shaft rotation and the rate at which rotatable elements pass the sensing end; and additional circuit means computing root mean square value and peak value and the ratio of the peak value to root mean square value of the passed electric signals whereby said values provide a measure of surface roughness and defects.

2. A system for monitoring operating conditions of and indicating defects and surface roughness in an antifriction bearing having an inner race mounted on a shaft for rotation, a fixedly mounted outer race, and rotatable elements disposed between the races comprising in combination:

light transmitting sensing means mounted in close proximity to the outward radial surface of the outer race for detecting variations in the distance between the outer race and sensing means as rotatable elements passing along the outer race cause outward elastic deformations in the outer race;

means associated with the sensing means for converting said detected variations into electric signals;

tachometer probe and circuit means for producing electric signals whose frequency is equal to the rate of rotation of the shaft;

means computing the frequency at which rotatable elements pass the sensing means divided by the frequency of shaft rotation thereby monitoring operating conditions of the antifriction bearing;

filter means passing the components of the electric signals whose frequencies are equal to the rate of shaft rotation and the rate at which rotatable elements pass the sensing means; and additional circuit means computing root mean square value and peak value and the ratio of the peak value to root means square value of the passed electric signals whereby said values provide a measure of surface roughness and defects.

3. A method of determining the angular position of unbalanced weight on a shaft comprising the steps of:

mounting the shaft on a rotatable inner race of an antifriction bearing wherein the outer race is fixedly mounted in a housing and rotatable load transmitting elements are disposed between the races;

rotating the shaft whereby loads transmitted by the rotatable elements to the outer races cause radially outward elastic deformations in proportion to the unbalanced weight;

generating a first electrical signal whose frequency corresponds to the shaft rotation and whose phase angle is synchronized with the angular position of a fixed timing point on the shaft;

producing a second electrical signal whose amplitude is proportional to the size of the deformations on the outer race;

filtering the second signal to remove all frequency components except those which are equal to the frequency of rotation of the shaft;

measuring the phase angle difference between the filtered second signal and the first signal whereby the phase angle difference is proportional to the difference in angular position between the fixed timing point on the shaft and the location of the maximum deformation on the outer race thus identifying the unbalanced weight position.

4. The method according to claim 3 involving an additional step of measuring the amplitude of the filtered second signal for determining the relative size of the unbalanced weight.

5. The method according to claim 3 wherein the step of producing the second signal is accomplished by using an optical fiber probe for transmitting a light signal onto the periphery of the outer race, receiving light reflected therefrom, and converting the received light signal into electrical signals.

* * * * *